United States Patent
Sivasubramanian et al.

(10) Patent No.: US 10,650,938 B2
(45) Date of Patent: May 12, 2020

(54) SILOXANE COPOLYMER AND SOLID POLYMER ELECTROLYTE COMPRISING SUCH SILOXANE COPOLYMERS

(71) Applicant: Momentive Performance Materials Inc., Waterford, NY (US)

(72) Inventors: Karthikeyan Sivasubramanian, Bangalore (IN); Neeraj Gupta, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 164 days.

(21) Appl. No.: 15/746,573

(22) PCT Filed: Jul. 22, 2016

(86) PCT No.: PCT/US2016/043469
§ 371 (c)(1),
(2) Date: Jan. 22, 2018

(87) PCT Pub. No.: WO2017/019475
PCT Pub. Date: Feb. 2, 2017

(65) Prior Publication Data
US 2019/0006715 A1    Jan. 3, 2019

Related U.S. Application Data

(60) Provisional application No. 62/198,890, filed on Jul. 30, 2015.

(51) Int. Cl.
| | | |
|---|---|---|
| *H01B 1/12* | (2006.01) | |
| *C08G 65/336* | (2006.01) | |
| *C08G 77/04* | (2006.01) | |
| *C08G 77/18* | (2006.01) | |
| *C08G 77/46* | (2006.01) | |
| *C08G 77/48* | (2006.01) | |
| *H01G 11/56* | (2013.01) | |
| *H01M 10/0565* | (2010.01) | |
| *H01G 9/20* | (2006.01) | |
| *H01G 9/028* | (2006.01) | |
| *H01M 10/052* | (2010.01) | |
| *C07F 7/18* | (2006.01) | |

(52) U.S. Cl.
CPC .............. *H01B 1/122* (2013.01); *C07F 7/188* (2013.01); *C08G 65/336* (2013.01); *C08G 77/045* (2013.01); *C08G 77/18* (2013.01); *C08G 77/46* (2013.01); *C08G 77/485* (2013.01); *H01G 9/028* (2013.01); *H01G 9/2009* (2013.01); *H01G 11/56* (2013.01); *H01M 10/052* (2013.01); *H01M 10/0565* (2013.01); *H01M 2300/0082* (2013.01); *Y02E 60/13* (2013.01)

(58) Field of Classification Search
CPC ........ H01B 1/122; H01B 1/20; C08G 65/336; C08G 65/2603; C08G 65/3331; C08G 65/334; C08G 65/3342; C08G 65/335; C08G 65/3353; C08G 77/045; C08G 77/14; C08G 77/18; C08G 77/46; C08G 77/485; C07F 7/18; C07F 7/188; C07F 7/0838; H01M 10/052; H01M 10/056; H01M 10/0565; H01M 10/0568; H01M 10/0567; H01G 9/025; H01G 9/028; H01G 9/2009; H01G 11/54; H01G 11/56
See application file for complete search history.

(56) References Cited

U.S. PATENT DOCUMENTS

| | | | |
|---|---|---|---|
| 6,117,963 A | 9/2000 | Boinowitz et al. | |
| 7,466,539 B2 | 12/2008 | Dementiev et al. | |
| 7,695,860 B2 | 4/2010 | Amine et al. | |
| 8,779,080 B2 * | 7/2014 | Arkles | C08G 77/14 528/27 |
| 2004/0248014 A1 * | 12/2004 | West | H01G 11/64 429/313 |
| 2005/0170254 A1 * | 8/2005 | West | H01M 10/052 429/313 |
| 2006/0035154 A1 | 2/2006 | West et al. | |
| 2009/0035656 A1 | 2/2009 | Lee et al. | |
| 2012/0226002 A1 | 9/2012 | Arkles et al. | |
| 2013/0040207 A1 | 2/2013 | Gupta et al. | |
| 2016/0215100 A1 * | 7/2016 | Hansen | A61K 9/7069 |

OTHER PUBLICATIONS

Patent Cooperation Treaty (PCT), International Search Report and Written Opinion for Application PCT/US2016/043469 filed Jul. 22, 2016 dated Sep. 22, 2016, International Searching Authority, EP.
Rossi et al., "Silicon-Containing Carbonates—Synthesis, Characterization, and Additive Effects for Silicon-Based Polymer Electrolytes," Silicon, pp. 201-208. (2010).
Rossi and West, "Silicon-containing liquid polymer electrolytes for application in lithium ion batteries," Polymer Int., Society of Chemical Industry, vol. 58, pp. 267-272. (2009).

* cited by examiner

*Primary Examiner* — Matthew R Diaz
(74) *Attorney, Agent, or Firm* — Joseph Waters; McDonald Hopkins LLC

(57) ABSTRACT

A silicone polyether for use in forming a solid polymer electrolyte film, the silicone polyether comprising a heterocyclic moiety. The silicone polyether comprising the heterocyclic moiety may be used to provide an electrolyte composition suitable for use in an electrochemical device. The silicone polyether comprising a heterocyclic moiety may also be used to form a solid polymer electrolyte that may be used to form a solid polymer electrolyte film, which may be suitable for use in electrochemical devices.

31 Claims, No Drawings

SILOXANE COPOLYMER AND SOLID POLYMER ELECTROLYTE COMPRISING SUCH SILOXANE COPOLYMERS

CROSS-REFERENCE TO RELATED APPLICATIONS

The present application claims priority to and the benefit of U.S. Provisional Application No. 62/198,890, entitled "Siloxane Copolymer and Solid Polymer Electrolyte Comprising Such Siloxane Copolymers," filed on Jul. 30, 2015, the disclosure of which is incorporated herein by reference in its entirety.

TECHNICAL FIELD

The present invention relates to a silicone polyether, an electrolyte comprising the silicone polyether, and an electrochemical device comprising the electrolyte. More particularly, the present invention relates to a silicone polyether having a heterocyclic moiety pendant to a silicon atom. The electrolyte composition comprising the silicone polyether has a high ionic conductivity and may be formed into a film suitable for use in electrochemical devices (e.g., lithium ion batteries) of various sizes and for a wide range of applications.

BACKGROUND

Ionically conductive materials are used in a variety of electrochemical devices including primary batteries, secondary batteries, solar capacitors, sensors, electrochemical displays, etc. A common ionically conductive material is an electrolyte employing a mixture of alkyl carbonate based liquids containing a lithium salt. These materials are able to form passive films around the anode and cathode, which enable the battery to function efficiently. A majority of known ionically conductive electrolytes used in lithium ion batteries are liquids, which may pose problems in battery applications due to leakage. This requires using more expensive metal containers to prevent leakage in addition to raising the cost of manufacturing them. Additionally, such electrolyte materials may also be highly reactive and inflammable, which may pose safety problems particularly if the battery is overcharged to temperatures above 125° C.

Solid electrolyte materials such as polymer electrolytes and gel electrolytes (collectively referred to herein as solid polymer electrolytes or SPEs) have been developed for use as conductive material in battery applications. Solid polymer electrolytes have excellent characteristics including thin film forming properties, flexibility, lightweight, elasticity, and transparency. These materials also do not exhibit the leakage associated with other ionic conductive materials, and may prevent decreases in battery capacity during repeated use and short-circuiting of positive and negative electrode materials. Solid polymer electrolytes may also exhibit high charging/discharging efficiency, which, along with the ability to be formed as films, allows these materials to be used in various types of batteries of different sizes and shapes.

Conventional batteries employing solid polymer electrolyte technology currently use porous poly(vinylidene) fluoride (PVdF) films swollen with organic carbonate solvents. These films, however, may pose flammability hazards and deficiencies due to limited life cycles.

Alternative electrolyte solvents have been sought. Polymers typically have poor ionic conductivities. Polyethylene oxides have ionic conductivities on the order of $10^{-6}$ S/cm.

Silicone polyethers have been studied as electrolyte solvent candidates, but many silicone polyethers have ionic conductivities less than $10^{-3}$ S/cm, which may not be useful for many battery applications, including, for example, lithium ion batteries. Accordingly, there is a need to develop improved electrolyte candidates that overcome the deficiencies of conventional electrolyte technologies.

SUMMARY

In one aspect, the present invention provides a novel silicone polyether. In another aspect, the present invention provides an electrolyte composition comprising such silicone polyethers. The electrolyte compositions may exhibit excellent ionic conductivity.

In one aspect, the silicone polyether is a silicone polyether comprising a heterocyclic moiety. The heterocyclic moiety may be, for example, a furfuryl moiety, a phospholane moiety, a thiophane moiety, or a pyrrolidone moiety.

In one aspect, the silicone polyether is chosen from a silane of Formula (1):

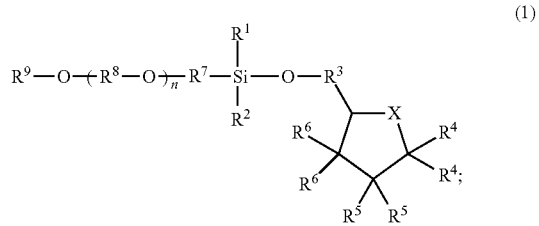

or a siloxane of Formula (2):

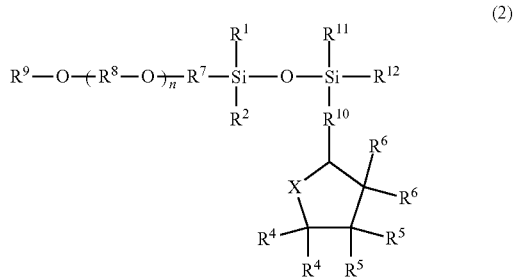

where $R^1$ and $R^2$ are independently chosen from a C1-C10 alkyl, a C6-C30 aryl, or an alkoxy of the formula —$OR^{13}$, where $R^{13}$ is a C1-C10 alkyl; $R^3$ is a C1-C10 alkylene; each occurrence of $R^4$, $R^5$, and $R^6$ is independently chosen from hydrogen or a C1-C10 alkyl; $R^7$ is a C2-C10 alkylene; $R^8$ is a C1-C10 alkylene; $R^9$ is a C1-C10 alkyl; $R^{10}$ is a C1-C10 alkylene; $R^{11}$ and $R^{12}$ are independently chosen from a C1-C10 alkyl, a C6-C30 aryl or an alkoxy of the formula —$OR^{13}$, where $R^{13}$ is a C1-C10 alkyl; X is chosen from O, S, N—$R^{14}$ or P—$R^{15}$, where $R^{14}$ and $R^{15}$ are independently chosen from H or a C1-C10 alkyl; and n is 2-50.

In one aspect, the present invention provides a silicone polyether comprising a furfuryl moiety. The silicone polyether comprising a furfuryl moiety may be a silane or a siloxane based compound. In one embodiment, the silicone polyether is a polyether of the Formula (3), a polyether of the Formula (4), or a combination thereof:

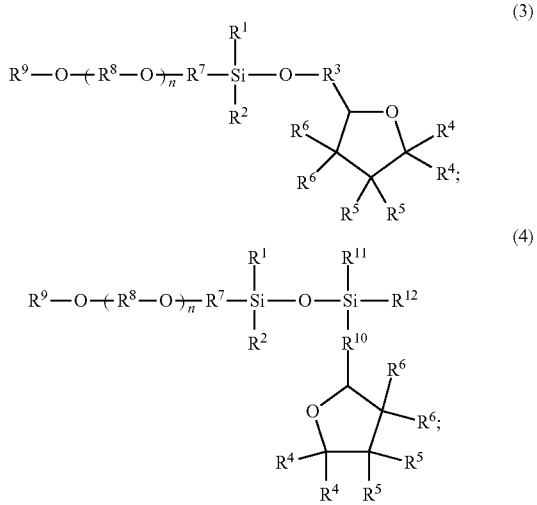

where $R^1$ and $R^2$ are independently chosen from a C1-C10 alkyl, a C6-C30 aryl or an alkoxy of the formula —$OR^{13}$, where $R^{13}$ is a C1-C10 alkyl; $R^3$ is a C1-C10 alkylene; each occurrence of $R^4$, $R^5$, and $R^6$ is independently chosen from hydrogen or a C1-C10 alkyl; $R^7$ is a C2-C10 alkylene; $R^8$ is a C1-C10 alkylene; $R^9$ is a C1-C10 alkyl; $R^{10}$ is a C1-C10 alkylene; $R^{11}$ and $R^{12}$ are independently chosen from a C1-C10 alkyl, a C6-C30 aryl or an alkoxy of the formula —$OR^{13}$, where $R^{13}$ is a C1-C10 alkyl; and n is 2-50.

In one aspect, the present invention provides an electrolyte composition comprising (i) a silicone polyether of Formula (1), Formula (2), or a combination of two or more thereof; and (ii) a salt. In one embodiment, the electrolyte composition may comprise a solid polymer and optionally a plasticizer and may be suitable for providing a solid polymer electrolyte film.

In still another aspect, the present invention provides an electrochemical device comprising a solid polymer electrolyte film formed from an electrolyte composition comprising (i) a silicone polyether represented by Formula (1), Formula (2), or a combination of two or more thereof, (ii) a salt, (iii) a solid polymer, and (iv) optionally a plasticizer.

According to one embodiment, the plasticizer comprises an alkyl carbonate, a cyclic carbonate, a glyme, a polyalkylene glycol dialkyl ether, or a combination of two or more thereof.

According to one embodiment, the plasticizer comprises an alkyl carbonate chosen from ethylene carbonate, propylene carbonate, butylenes carbonate, dimethyl carbonate, diethyl carbonate, dipropyl carbonate, or a combination of two or more thereof.

According to one embodiment, the plasticizer comprises a mixture of two alkyl carbonates in a ratio of from about 3:1 to about 1:1.

According to one embodiment, the salt is a lithium salt.

According to one embodiment, the electrolyte composition comprises from about 40 to about 95% by weight of the silicone polyether of Formula (1), Formula (2), or a combination of two or more thereof, and from about 5 to about 60% by weight of plasticizer that comprises the salt in an amount of from about 5 to about 20% by weight based on the weight of the plasticizer.

According to one embodiment, the present invention provides a solid polymer electrolyte film made from such solid polymer electrolyte compositions.

According to one embodiment, the film has an ionic conductivity of about $1.0 \times 10^{-5}$ S/cm$^{-1}$ or greater; about $1.0 \times 10^{-4}$ S/cm$^{-1}$ or greater; or even about $1.0 \times 10^{-3}$ S/cm$^{-1}$ or greater.

According to another aspect, the present invention provides an electrochemical device comprising such solid polymer electrolyte films.

According to one embodiment, the present invention provides films formed from such solid polymer electrolyte compositions.

According to one embodiment, an electrochemical device comprises such films.

These and other aspects of the invention may be further understood with reference to the following figures and detailed description.

DETAILED DESCRIPTION

The present invention provides a silicone polyether and an electrolyte composition comprising such materials. The present silicone polyether(s) and the electrolyte composition comprising the silicone polyether(s) exhibit excellent ionic conductivity.

In one aspect, the silicone polyether is a silicone polyether comprising a heterocyclic moiety. The silicone polyether may be a silane or a siloxane. The heterocyclic moiety may be, for example, a furfuryl moiety, a phospholane moiety, a thiophane moiety, or a pyrrolidone moiety. The silicone polyether may be expressed by a silane of Formula (1):

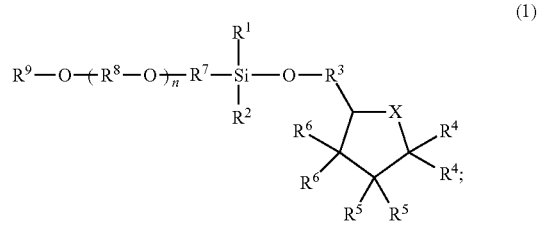

or a siloxane of Formula (2):

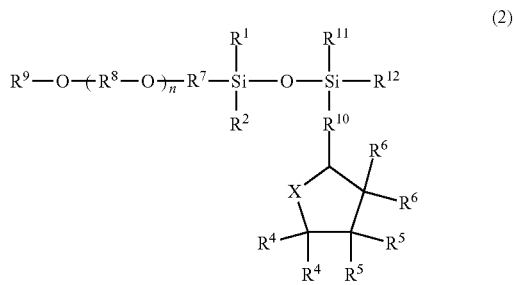

where $R^1$ and $R^2$ are independently chosen from a C1-C10 alkyl, a C6-C30 aryl or an alkoxy of the formula —$OR^{13}$, where $R^{13}$ is a C1-C10 alkyl; $R^3$ is a C1-C10 alkylene; each occurrence of $R^4$, $R^5$, and $R^6$ is independently chosen from hydrogen or a C1-C10 alkyl; $R^7$ is a C2-C10 alkylene; $R^8$ is a C1-C10 alkylene; $R^9$ is a C1-C10 alkyl; $R^{10}$ is a C1-C10 alkylene; $R^{11}$ and $R^{12}$ are independently chosen from a C1-C10 alkyl, a C6-C30 aryl or an alkoxy of the formula —$OR^{13}$, where $R^{13}$ is a C1-C10 alkyl; X is chosen from O, S, N—$R^{14}$ or P—$R^{15}$, where $R^{14}$ and $R^{15}$ are chosen from H or a C1-C10 alkyl; and n is 2-50.

In embodiments, X is oxygen, and the silicone polyether is chosen from a compound of Formula (3) and/or Formula (4):

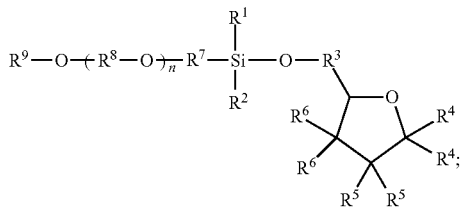
(3)

or a siloxane of Formula (2):

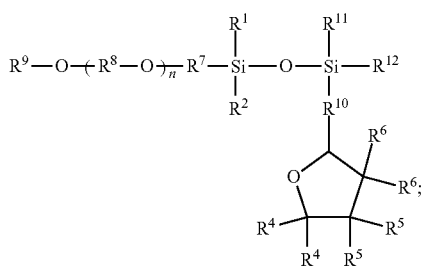
(4)

where $R^1$-$R^9$ may be as described above.

In embodiments, in either a compound of any of Formula (1), Formula (2), Formula (3), or Formula (4), $R^4$, $R^5$, and $R^6$ are each hydrogen. In embodiments, in either a compound of Formula (1), Formula (2), Formula (3), or Formula (4), $R^1$ and $R^2$ are independently chosen from methyl, ethyl, propyl, or butyl. In one embodiment, in either a compound of Formula (1), Formula (2), Formula (3), or Formula (4), $R^1$ and $R^2$ are each methyl. In embodiments of Formula (2) or Formula (4), $R^{11}$ and $R^{12}$ may independently be chosen from methyl, ethyl, propyl, or butyl. In one embodiment, $R^{11}$ and $R^{12}$ are each methyl.

In one embodiment, the silicone polyether is a compound of the formula:

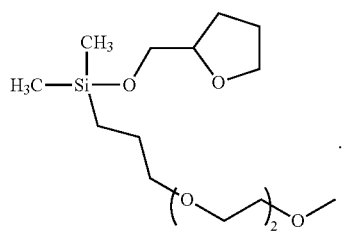

In one embodiment, the silicone polyether is a compound of the formula:

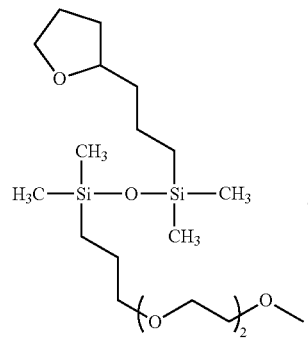

The silicone polyether can be made by reaction of a halo silane with an allyl glycol ether via a hydrosilylation reaction followed by substitution of a halo group with an alcohol functionalized molecule in a suitable solvent. Examples of suitable solvents include, but are not limited to toluene, xylene, hexane, and combinations thereof.

In an embodiment, the silicone polyether comprising the heterocyclic moiety may be used to provide an electrolyte composition. The present silicone polyether comprising the heterocycilc moiety may be used as a solvent in an electrolyte composition. The electrolyte composition may comprise (i) at least one silicone polyether comprising a heterocyclic moiety, and (ii) a one or more salts. It will be appreciated that the electrolyte may comprise a plurality of silicone polyethers comprising a heterocyclic moiety. Where a plurality of silicone polyethers are employed, the respective heterocyclic moieties may comprise the same or different heteroatoms from one another.

In embodiments, the electrolyte composition may comprise (i) at least one silicone polyether comprising a moiety derived from a furfuryl alcohol, and (ii) a one or more salts. The electrolyte may be formed by dissolving the one or more salts in the silicone polyether comprising a furfuryl moiety. It will be appreciated that the electrolyte may comprise a plurality of silicone polyethers comprising a furfuryl moiety, where the silicone polyethers may have the same or different structures.

The salt employed in the electrolyte is not limited to any particular salt and may be chosen for a particular purpose or application. Suitable salts include, but are not limited to, alkali metal salts. The electrolyte may comprise a plurality of different salts. In one embodiment, the salt is a lithium salt. Examples of suitable lithium salts include, but are not limited to, $LiClO_4$, $LiCF_3SO_3$, $LiBF_4$, $LiPF_6$, $LiAsF_6$, $LiN(SO_2C_2F_5)_2$, $Li(CF_3SO_2)_2N$, $Li(CF_3SO_2)_3C$, $LiN(SO_2C_2F_5)_2$, lithium alkyl fluorophosphates, organoborate salts, etc., or a combination of two or more thereof. Examples of suitable organoborate salts include, but are not limited to, LIBOB (lithium bis oxalato borate), LiDfOB (lithium difluoro oxalate borate).

In one embodiment, the salt is present in a concentration of about 0.2 to about 3 M; from about 0.5 to about 2 M; even from about 1 to about 1.5 M. In other embodiments, the salt is present in a concentration of from about 0.2 to about 1 M, from about 0.4 to about 0.8 M, even about 0.5 to about 0.6 M. Here, as elsewhere in the specification and claims, individual numerical values can be combined to form additional and/or non-disclosed ranges.

The present invention also provides a solid polymer electrolyte (SPE) composition comprising (i) a silicone polyether comprising a heterocyclic moiety, (ii) a salt, (iii)

at least one polymer binder, and (iv) optionally, a plasticizer. In embodiments, the SPE composition comprises a silicone polyether comprising a furfuryl moiety. In an embodiment, the polymer binder may be a solid polymer that is a solid when standing alone at room temperature. As a result, the ratio of solid polymer to the other electrolyte components can be selected so as to provide an electrolyte that is a solid at room temperature. A suitable solid polymer is an aprotic polar polymer or aprotic rubbery polymer. Examples of suitable solid polymers include, but are not limited to, polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO), or a combination of two or more thereof.

The solid polymer electrolyte can be generated by preparing a precursor solution that includes one or more silicone polyethers comprising a heterocyclic moiety and a solution that includes at least one solid polymer. The solution that includes the solid polymer can be generated by dissolving the solid polymer in a solvent such as N-methylpyrrolidone (NMP), dimethyl formamide, dimethyl acetamide, tetrahydrofuran, acetonitrile, and/or water. The electrolyte may comprise other additives, siloxanes, and/or silanes. One or more salts can be added to the precursor solution or the salt can be dissolved in a component of the precursor solution before adding the component to the precursor solution. A solid electrolyte can be formed by evaporating the solvent from the precursor solution.

An electrolyte that includes one or more solid polymers can also be prepared by polymerizing a solid polymer in the presence of the silicone polyether. For instance, a precursor solution can be provided comprising one or more silicone polyethers having a furfuryl moiety, monomers for the solid polymer, and a radical initiator. Suitable radical initiators include, but are not limited to, one or more thermal initiators including azo compounds such as azoisobutyronitrile, peroxide compounds such as benzoylperoxide, and bismaleimide. The precursor solution can optionally be prepared to include one or more additives and/or one or more silanes. One or more salts can be added to the precursor solution, or the salt can be dissolved in a component of the precursor solution before adding the component to the precursor solution. The electrolyte can be formed by polymerizing the monomers.

The plasticizer is not particularly limited and may be selected from any suitable material for use in forming an SPE. Suitable plasticizers include, but are not limited to, alkyl carbonates, cyclic carbonates, glymes, polyalkylene glycol dialkyl ethers, and combinations of two or more thereof.

Carbonates suitable as the plasticizer include, but are not limited to, ethylene carbonate (EC), propylene carbonate (PC), butylene carbonate, dimethyl carbonate (DMC), diethyl carbonate, dipropyl carbonate, and the like, and combinations of two or more thereof. In one embodiment, the plasticizer comprises a mixture of carbonates. In one embodiment, the plasticizer comprises a mixture of carbonates in a ratio of from about 3:1 to 1:1. In another embodiment, the plasticizer comprises a mixture of carbonates in a ratio of 2:1. In still another embodiment, the plasticizer comprises a mixture of carbonates in a ratio of 1:1. Here, as well as elsewhere in the specification and claims, individual numerical values can be combined to form additional and/or non-disclosed ranges. In one embodiment, the plasticizer comprises a 1:1 mixture by weight of PC:EC. In one embodiment, the plasticizer comprises a 1:1 mixture by weight of EC:DMC.

Examples of suitable glymes include, but are not limited to, dimethoxyethane ($C_4H_{10}O_2$ or "DME"), diglyme ($C_6H_{14}O_3$), triglyme ($C_8H_{18}O_4$), tetraglyme ($C_{10}H_{22}O_5$), and the like, or a combination of two or more thereof. Examples of suitable polyalkylene glycol dialkyl ethers include, but are not limited to, polyethylene glycol dimethyl ether, polyethylene glycol diethyl ether, polyethylene glycol dipropyl ether, polyethylene glycol dibutyl ether, polyethylene glycol diglycidyl ether, polypropylene glycol dimethyl ether, polypropylene glycol diglycidyl ether, polypropylene glycol/polyethylene glycol copolymer at the end portion of dibutyl ether, polyethylene glycol/polypropylene glycol block copolymer at the end portion of dibutyl ether, and the like, or a combination of two or more thereof. Still other examples of suitable plasticizers include non-aqueous polar solvents such as tetrahydrofuran, 2-methyltetrahydrofuran, 1,3-dioxiran, 4,4-dimethyl-1,3-dioxiran, γ-butyrolactone, and acetonitrile.

In one embodiment, the lithium salt may be present in a range of from about 2 to about 40 wt. % by weight based on the weight of the plasticizer. In another embodiment, the salt is present in an amount of from about 5 to about 20 wt. % based on the weight of the plasticizer.

In one embodiment, the SPE composition comprises from about 40 to about 95% by weight of the polyether; from about 50 to about 90% by weight of the polyether; from about 55 to about 85% by weight of the polyether; even from about 60 to about 75% by weight of the polyether.

In one embodiment, the SPE composition comprises from about 40 to about 95% by weight of the polyether, from about 5 to about 60% by weight of plasticizer; and about 5 to about 20% by weight of the salt based on the weight of the plasticizer. In another embodiment, the SPE composition comprises from about 40 to about 95% by weight of the polyether, from about 10 to about 55% by weight of plasticizer, and from about 1 to about 15% by weight of the lithium salt based on the weight of the plasticizer. In still another embodiment, the SPE composition comprise from about 40 to about 95% by weight of the polyether, from about 25 to about 50% by weight of plasticizer, and from about 3 to about 9% by weight of the salt based on the weight of the plasticizer. Here, as well as elsewhere in the specification and claims, individual numerical values can be combined to form additional and/or non-disclosed ranges.

An electrolyte comprising a silicone polyether comprising a furfuryl moiety may have an ionic conductivity of about $1 \times 10^{-4}$ S/cm or greater, about $1 \times 10^{-4}$ S/cm or greater, even about $1 \times 10^{-3}$ S/cm or greater. In one embodiment, the electrolyte has an ionic conductivity of from about $1 \times 10^{-2}$ S/cm to about $1 \times 10^{-4}$ S/cm; from about $5 \times 10^{-2}$ S/cm to about $5 \times 10^{-3}$ S/cm; even from about $7 \times 10^{-2}$ S/cm to about $1 \times 10^{-3}$ S/cm. In one embodiment, the ionic conductivity may be from about $1 \times 10^{-3}$ S/cm to about $1 \times 10^{-4}$ S/cm. Here as elsewhere in the specification and claims, numerical values may be combined to provide new and non-disclosed ranges.

The SPE, or a film formed therefrom, may have an ionic conductivity of about $1 \times 10^{-5}$ S/cm$^{-1}$ or greater. In one embodiment, the SPE or a film formed therefrom has an ionic conductivity of about $1 \times 10^{-4}$ S/cm$^{-1}$ or greater. In still another embodiment the SPE or a film formed therefrom has an ionic conductivity of $1 \times 10^{-3}$ S/cm$^{-1}$ or greater. In one embodiment, the SPE or a film formed therefrom has an ionic conductivity of about $1 \times 10^{-4}$ S/cm$^{-1}$ to about $1 \times 10^{-3}$ S/cm$^{-1}$. Here, as elsewhere in the specification and claims, individual numerical values can be combined to form additional and/or non-disclosed ranges.

The electrolyte comprising the silicone polyethers having a furfuryl moiety may be used in an electrochemical device. Examples of electromechanical devices that may employ the electrolytes to include, but are not limited to, primary batteries, secondary batteries, capacitors, etc.

Suitable batteries can have a variety of different configurations including, but not limited to, stacked configuration, and "jellyroll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

The electrolyte can be applied to batteries in the same way as carbonate-based electrolytes. As an example, batteries with a liquid electrolyte can be fabricated by injecting the electrolyte into a spiral wound cell or prismatic type cell. The electrolyte can be also coated onto the surface of electrode substrates and assembled with a porous separator to fabricate a single or multi-stacked cell that can enable the use of flexible packaging.

The solid and/or gel electrolytes described above can also be applied to electrochemical devices in the same way as solid carbonate-based electrolytes. For instance, a precursor solution having components for a solid electrolyte can be applied to one or more substrates. Suitable substrates include, but are not limited to, anode substrates, cathode substrates and/or separators such as a polyolefin separator, nonwoven separator or polycarbonate separator. The precursor solution is converted to a solid or gel electrolyte such that a film of the electrolyte is present on the one or more substrates. In some instances, the substrate is heated to solidify the electrolyte on the substrate. An electrochemical cell can be formed by positioning a separator between an anode and a cathode such that the electrolyte contacts the anode and the cathode.

An example of a suitable secondary lithium battery construction includes the electrolyte activating one or more cathodes and one or more anodes. Cathodes may include one or more active materials such as lithium metal oxide, $Li_xVO_y$, $LiCoO_2$, $LiNiO_2$, $LiNi_{1-x}Co_yMe_zO_2$, $LiMn_{0.05}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, vanadium oxide, carbon fluoride and mixtures thereof wherein Me is Al, Mg, Ti, B, Ga, Si, Mn, Zn, and combinations thereof, and Mc is a divalent metal such as Ni, Co, Fe, Cr, Cu, and combinations thereof. Anodes may include one or more active materials such as graphite, soft carbon, hard carbon, $Li_4Ti_5O_{12}$, tin alloys, silica alloys, intermetallic compounds, lithium metal, lithium metal alloys, and combinations thereof. An additional or alternate anode active material includes a carbonaceous material or a carbonaceous mixture. For instance, the anode active material can include or consist of one, two, three or four components selected from the group consisting of: graphite, carbon beads, carbon fibers, and graphite flakes. In some instances, the anode includes an anode substrate and/or the cathode includes a cathode substrate. Suitable anode substrates include, but are not limited to, lithium metal, titanium, a titanium alloy, stainless steel, nickel, copper, tungsten, tantalum or alloys thereof. Suitable cathode substrates include, but are not limited to, aluminum, stainless steel, titanium, or nickel substrates.

Aspects of the invention may be further understood in view of the following examples. The examples are only for purposes of illustrating embodiments or aspects of the invention, but the invention is not limited to such examples.

EXAMPLES

Preparation of Silicone Polyether

Tetra hydro furfuryl silane polyether was synthesized according to Scheme 1 provided below:

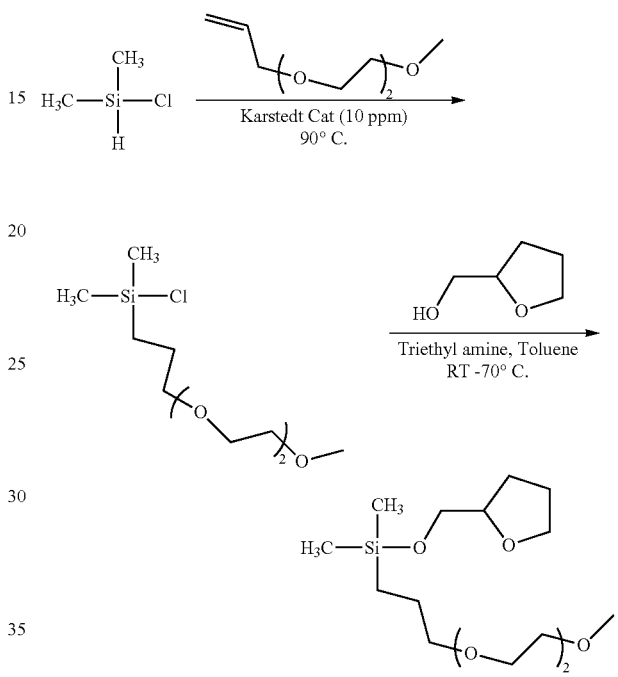

Allyldiethyleneglycol monomethylether was obtained from Gelest. Chlorodimethylsilane, triethylamine and tetrahydrofurfuryl alcohol were obtained from Sigma Aldrich.

Allyldiethyleneglycol monomethylether (44.5 gm, 0.281 mol) was taken in a three neck RB connected to a dry ice condenser. To this 10 ppm of Karstedt Catalyst in xylene was added. Chlorodimethylsilane (25 gm, 0.265 mol) was added drop wise to the reaction mixture and the reaction mixture was heated to 90° C. The reaction was stopped after 4 h and unreacted chlorodimethylsilane was removed by rotovac. The unpurified reaction mixture was used for second step.

The product obtained from step 1 was taken in a three neck RB along with 50 ml of toluene. To this a mixture of triethylamine (27.5 gm, 0.262 mol) and tetrahydrofurfuryl alcohol (28.25 gm, 0.262 mol) in toluene was added drop wise at room temperature. The stirring was continued at that temperature for 4 h. After 4 h, the mixture was heated to 70° C. and kept at that temperature for 18 h. The formed precipitate was filtered. Volatiles were removed from the filtrate and it was used for ionic conductivity measurement. The GC-MS analysis of the final product indicated the formation of the desired product to the extent of ~80%.

Ionic Conductivity Measurements

LiBOB or $LiPF_6$ salt was dissolved in different concentrations in solvent (1). Ionic conductivity of the composition was measured using Hach sension 7 conductivity meter. The conductivity values are reported in Table 1 below.

TABLE 1

Ionic conductivity measurements with tetra hydro furfuryl silane polyether

| Solvent | Ionic Conductivity (mS/cm) | Temperature (° C.) |
|---|---|---|
| Furfuryl silane polyether (1)- 1.0M $LiPF_6$ | 0.75 | 22.4 |
| Furfuryl silane polyether (1)- 0.8M LiBOB | 1.07 | 24.0 |
| Furfuryl silane polyether (1)- 1.0M LiBOB | 0.68 | 27.4 |
| Furfuryl silane polyether (1)- 0.6M LiBOB | 0.92 | 27.5 |
| Furfuryl silane polyether (1)- 0.4M LiBOB | 0.74 | 26.8 |
| Furfuryl silane polyether (1)- 0.2M LiBOB | 0.38 | 26.0 |

Embodiments of the invention have been described above and, obviously, modifications and alterations may occur to others upon the reading and understanding of this specification. The claims as follows are intended to include all modifications and alterations insofar as they come within the scope of the claims or the equivalent thereof.

What is claimed is:

1. A silicone polyether of one of the Formula (1) or Formula (2):

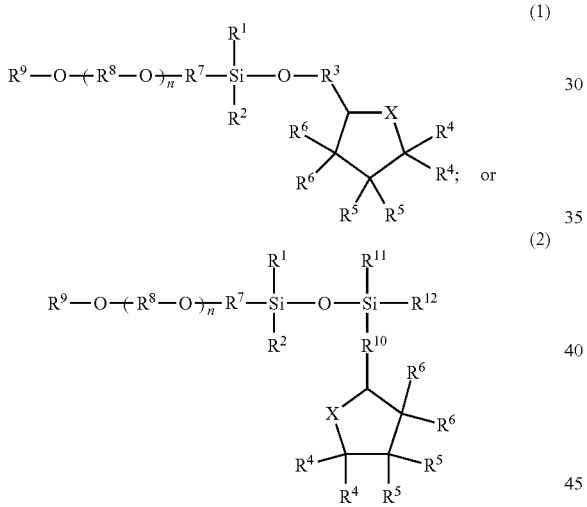

where $R^1$ and $R^2$ are independently chosen from a C1-C10 alkyl, a C6-C30 aryl, or an alkoxy of the formula $-OR^{13}$, where $R^{13}$ is a C1-C10 alkyl; $R^3$ is a C1-C10 alkylene; each occurrence of $R^4$, $R^5$, and $R^6$ is independently chosen from hydrogen or a C1-C10 alkyl; $R^7$ is a C2-C10 alkylene; $R^8$ is a C1-C10 alkylene; $R^9$ is a C1-C10 alkyl; $R^{10}$ is a C1-C10 alkylene; $R^{11}$ and $R^{12}$ are independently chosen from a C1-C10 alkyl, a C6-C30 aryl or an alkoxy of the formula $-OR^{13}$, where $R^{13}$ is a C1-C10 alkyl; X is chosen from O, S, $N-R^{14}$ or $P-R^{15}$, where $R^{14}$ and $R^{15}$ are independently chosen from hydrogen or a C1-C10 alkyl; and n is 2-50.

2. The silicone polyether of claim 1, wherein $R^4$, $R^5$, and $R^6$ in Formula (1) are each hydrogen.

3. The silicone polyether of claim 1, wherein $R^1$ and $R^2$ in Formula (1) are independently chosen from methyl, ethyl, propyl, or butyl.

4. The silicone polyether of claim 1, wherein $R^1$ and $R^2$ in Formula (1) are each methyl.

5. The silicone polyether of claim 1, wherein $R^4$, $R^5$, and $R^6$ in Formula (1) are each hydrogen, and $R^1$ and $R^2$ in Formula (1) are each methyl.

6. The silicone polyether of claim 1, wherein $R^4$, $R^5$, and $R^6$ in Formula (2) are each hydrogen.

7. The silicone polyether of claim 1, wherein $R^1$, $R^2$, $R^{11}$, and $R^{12}$ in Formula (2) are independently chosen from methyl, ethyl, propyl or butyl.

8. The silicone polyether of claim 1, wherein $R^1$, $R^2$, $R^{11}$, and $R^{12}$ in Formula (2) are each methyl.

9. The silicone polyether of claim 1, wherein $R^4$, $R^5$, and $R^6$ in Formula (2) are each hydrogen, and $R^1$, $R^2$, $R^{11}$, and $R^{12}$ in Formula (2) are each methyl.

10. The silicone polyether of claim 1, wherein X is O.

11. The silicone polyether of claim 1 wherein the silicone polyether is of the formula:

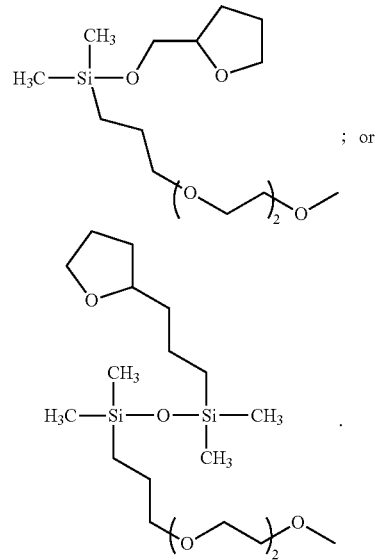

12. An electrolyte composition comprising (i) a silicone polyether, and (ii) a salt, the silicone polyether being chosen from a compound of one of the Formula (1) or Formula (2):

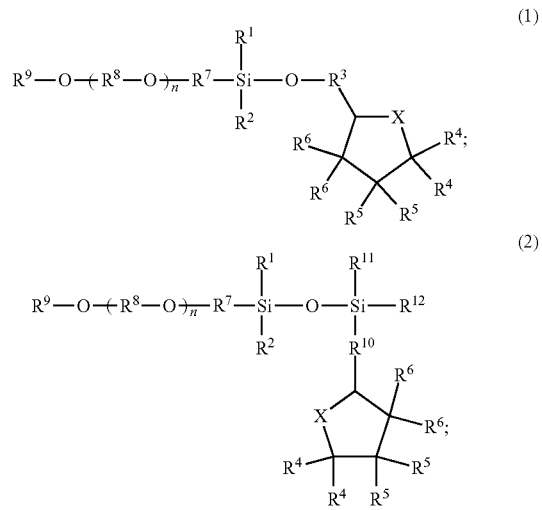

or a combination of two or more thereof; where $R^1$ and $R^2$ are independently chosen from a C1-C10 alkyl, a C6-C30 aryl, or an alkoxy of the formula $OR^{13}$, where $R^{13}$ is a C1-C10 alkyl; $R^3$ is a C1-C10 alkylene; each occurrence of $R^4$, $R^5$, and $R^6$ is independently chosen from hydrogen or a C1-C10 alkyl; $R^7$ is a C2-C10 alkylene; $R^8$ is a C1-C10 alkylene; $R^9$ is a C1-C10 alkyl; $R^{10}$ is a C1-C10 alkylene; and $R^{1-2}$ are independently chosen from a C1-C10 alkyl, a C6-C30 aryl or an alkoxy of the formula $-OR^{13}$, where $R^{13}$ is a C1-C10 alkyl; X is chosen from O, S, $N-R^{14}$ or $P-R^{15}$, where $R^{14}$ and $R^{15}$ are independently chosen from H or a C1-C10 alkyl; and n is an integer from 2-50.

13. The electrolyte composition of claim 12, wherein $R^4$, $R^5$, and $R^6$ in the silicone polyether of Formula (1) are each hydrogen.

14. The electrolyte composition of claim 12, wherein $R^1$ and $R^2$ in the silicone polyether of Formula (1) are independently chosen from methyl, ethyl, propyl or butyl.

15. The electrolyte composition of claim 12, wherein $R^1$ and $R^2$ in the silicone polyether of Formula (1) are each methyl.

16. The electrolyte composition of claim 12, wherein $R^4$, $R^5$, and $R^6$ are each hydrogen, and $R^1$ and $R^2$ are each methyl in the silicone polyether of Formula (1).

17. The electrolyte composition of claim 12, wherein $R^4$, $R^5$, and $R^6$ in the silicone polyether of Formula (2) are each hydrogen.

18. The electrolyte composition of claim 12, wherein $R^1$, $R^2$, $R^{11}$, and $R^{12}$ in the silicone polyether of Formula (2) are independently chosen from methyl, ethyl, propyl or butyl.

19. The electrolyte composition of claim 12, wherein $R^1$, $R^2$, $R^{11}$, and $R^{12}$ in the silicone polyether of Formula (2) are each methyl.

20. The electrolyte composition of claim 12, wherein $R^4$, $R^5$, and $R^6$ are each hydrogen, and $R^1$, $R^2$, $R^{11}$, and $R^{12}$ in the silicone polyether of Formula (2) are each methyl.

21. The electrolyte composition of claim 12, wherein X is O.

22. The electrolyte composition of claim 12 wherein the silicone polyether is chosen from:

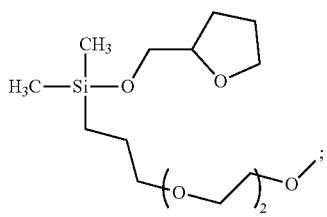

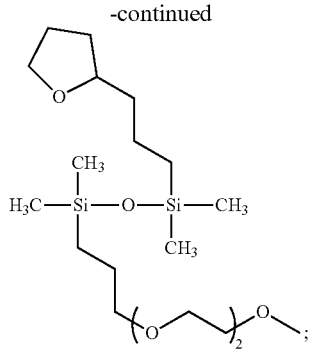

or a combination thereof.

23. The electrolyte composition of claim 12, wherein the salt is a lithium salt.

24. The electrolyte composition of claim 23, wherein the lithium salt is chosen from $LiClO_4$, $LiCF_3SO_3$, $LiBF_4$, $LiPF_6$, $LiAsF_6$, $LiN(SO_2C_2F_5)_2$, $Li(CF_3SO_2)2N$, $Li(CF_3SO_2)3C$, $LiN(SO_2C_2F_5)2$, lithium alkyl fluorophosphates, organoborate salts, or a combination of two or more thereof.

25. The electrolyte composition of claim 12, further comprising (iii) a solid polymer.

26. The electrolyte composition of claim 25, wherein the solid polymer is chosen from polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO), or a combination of two or more thereof.

27. The electrolyte composition of claim 25, further comprising (iv) a plasticizer, wherein the plasticizer is chosen from an alkyl carbonate, a cyclic carbonate, a glyme, a polyalkylene glycol dialkyl ether, or a combination of two or more thereof.

28. The electrolyte composition of claim 12, wherein the electrolyte composition has an ionic conductivity of about $1 \times 10^{-5}$ S/cm or greater.

29. The electrolyte composition of claim 12, wherein the electrolyte composition has an ionic conductivity of about $1 \times 10^{-4}$ S/cm or greater.

30. The electrolyte composition of claim 12, wherein the electrolyte composition has an ionic conductivity of about $1 \times 10^{-2}$ S/cm to about $1 \times 10^{-4}$ S/cm.

31. An electrochemical device comprising the electrolyte composition of claim 12.

* * * * *